(12) United States Patent
Hutchins et al.

(10) Patent No.: US 7,868,902 B1
(45) Date of Patent: Jan. 11, 2011

(54) SYSTEM AND METHOD FOR PIXEL DATA ROW FORWARDING IN A 3-D GRAPHICS PIPELINE

(75) Inventors: Edward A. Hutchins, Mountain View, CA (US); Paul Kim, Fremont, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 10/846,773

(22) Filed: May 14, 2004

(51) Int. Cl.
G09G 5/00 (2006.01)
G09G 5/36 (2006.01)
G06T 1/20 (2006.01)

(52) U.S. Cl. .................. 345/612; 345/506; 345/557

(58) Field of Classification Search .......... 345/531, 345/506, 557, 539, 560, 501, 502, 530, 418, 345/581, 612–614
See application file for complete search history.

(56) References Cited

U.S. PATENT DOCUMENTS

| | | | | |
|---|---|---|---|---|
| 4,241,341 A | * | 12/1980 | Thorson | 345/27 |
| 5,285,323 A | * | 2/1994 | Hetherington et al. | 711/122 |
| 5,493,644 A | * | 2/1996 | Thayer et al. | 345/531 |
| 5,710,577 A | * | 1/1998 | Laumeyer | 345/548 |
| 5,748,202 A | | 5/1998 | Nakatsuka et al. | |
| 5,935,240 A | | 8/1999 | Mennemeier et al. | |
| 5,977,977 A | * | 11/1999 | Kajiya et al. | 345/418 |
| 6,025,854 A | * | 2/2000 | Hinz et al. | 345/538 |
| 6,046,747 A | * | 4/2000 | Saunders et al. | 345/582 |
| 6,148,368 A | * | 11/2000 | DeKoning | 711/113 |
| 6,157,987 A | | 12/2000 | Krishnamurthy et al. | |
| 6,236,413 B1 | * | 5/2001 | Gossett et al. | 345/506 |
| 6,433,788 B1 | | 8/2002 | Morein | |
| 6,437,789 B1 | | 8/2002 | Tidwell et al. | |
| 6,496,192 B1 | | 12/2002 | Shreesha et al. | |
| 6,633,299 B1 | | 10/2003 | Sreenivas et al. | |
| 6,636,223 B1 | * | 10/2003 | Morein | 345/581 |
| 6,704,026 B2 | * | 3/2004 | Kurihara et al. | 345/629 |
| 6,915,412 B2 | * | 7/2005 | Nguyen et al. | 712/23 |
| 7,042,462 B2 | | 5/2006 | Kim et al. | |
| 2002/0124141 A1 | | 9/2002 | Dawson | |
| 2004/0246260 A1 | * | 12/2004 | Kim et al. | 345/557 |

OTHER PUBLICATIONS

Igehy H et al; "Parallel Texture Caching" Proceedings 1999 Euro Graphics/Siggraph Workshop on Graphics Hardware. Los Angeles, CA Aug. 8-9, 1999; [Siggraph/Eurographics Workshop on Graphics Hardware], New York, NY; ACM, US Aug. 8, 1999, pp. 95-106, XP00977716. ISBN: 978-1-58113-170-3.

* cited by examiner

Primary Examiner—Joni Hsu

(57) ABSTRACT

A system and method for a row forwarding of pixel data in a 3-D graphics pipeline. Specifically, in one embodiment a data write unit capable of row forwarding in a graphics pipeline includes a first memory and logic. The first memory stores a plurality of rows of pixel information associated with a pixel. The plurality of rows of pixel information includes data related to surface characteristics of the pixel and includes a first row, e.g., a front row, and a second row, e.g., a rear row. A data write unit includes first logic for accessing a portion of the second row and for storing data accessed therein into a portion of the first row. The data write unit also comprises logic for recirculating the plurality of rows of pixel information to an upstream pipeline module for further processing thereof.

26 Claims, 16 Drawing Sheets

850

1300C

| R-0 | TEX-2 1330 |
|---|---|
| TEX-1 1320 ||
| R-0 | TEX-3 1310 |

FIGURE 13C

SYSTEM AND METHOD FOR PIXEL DATA ROW FORWARDING IN A 3-D GRAPHICS PIPELINE

RELATED UNITED STATES PATENT APPLICATION

This Application is related to U.S. patent application Ser. No. 10/846,774 by Ed Hutchins, Paul Kim, and Brian Angell filed concurrently on May 14, 2004, entitled "System and Method for a Universal Data Write Unit in a 3-D Graphics Pipeline Including Generic Cache Memories," and assigned to the assignee of the present invention. To the extent not repeated herein, the contents of this related patent application are hereby incorporated herein by reference.

FIELD OF THE INVENTION

Embodiments of the present invention relate to graphics processors. More specifically, embodiments of the present invention relate to systems and methods for data forwarding between rows of a pixel packet in a 3-D graphics pipeline.

BACKGROUND ART

The rendering of three-dimensional graphical images is of interest in a variety of electronic games and other applications. Rendering is the general term that describes the overall multi-step process of transitioning from a database representation of a three-dimensional object to a two-dimensional projection of the object onto a viewing surface.

The rendering process involves a number of steps, such as, for example, setting up a polygon model that contains the information which is subsequently required by shading/texturing processes, applying linear transformations to the polygon mesh model, culling back facing polygons, clipping the polygons against a view volume, scan converting/rasterizing the polygons to a pixel coordinate set, and shading/lighting the individual pixels using interpolated or incremental shading techniques.

Graphics Processing Units (GPUs) are specialized integrated circuit devices that are commonly used in graphics systems to accelerate the performance of a 3-D rendering application. GPUs are commonly used in conjunction with a central processing unit (CPU) to generate three-dimensional images for one or more applications executing on a computer system. Modern GPUs typically utilize a graphics pipeline for processing data.

Prior art FIG. 1 shows a diagram depicting the various stages of a traditional prior art pipeline 100. The pipeline 100 is a conventional "deep" pipeline having stages dedicated to performing specific functions. A transform stage 105 performs geometrical calculations of primitives and may perform a clipping operation. A setup/raster stage 110 rasterizes the primitives. A texture address 115 and texture fetch 120 stage are utilized for texture mapping. A fog stage 130 implements a fog algorithm. An alpha test stage 135 performs an alpha test. A depth test 140 performs a depth test for culling occluded pixels. An alpha blend stage 145 performs an alpha blend color combination algorithm. A memory write stage 150 writes the output of the pipeline.

The stages of the traditional GPU pipeline architecture illustrated in FIG. 1 are typically optimized for high-speed rendering operations (e.g., texturing, lighting, shading, etc.) using a widely implemented graphics programming API (application programming interface), such as, for example, the OpenGL™ graphics language, Direct3D™, and the like. The architecture of the pipeline 100 is configured as a multi-stage deep pipeline architecture in order to maximize the overall rendering throughput of the pipeline. Generally, deep pipeline architectures have sufficient data throughput (e.g., pixel fill rate, etc.) to implement fast, high quality rendering of even complex scenes.

There is an increasing interest in utilizing three-dimensional (3-D) graphics in portable handheld devices where cost and power consumption are important design requirements. Such devices include, for example, wireless phones, personal digital assistants (PDAs), and the like. However, the traditional deep pipeline architecture requires a significant chip area, resulting in greater cost than desired. Additionally, a deep pipeline consumes significant power, even if the stages are performing comparatively little processing. This is because many of the stages consume about the same amount of power regardless of whether they are processing pixels.

As a result of cost and power considerations, the conventional deep pipeline architecture illustrated in FIG. 1 is unsuitable for many graphics applications, such as implementing three-dimensional games on wireless phones and PDAs. Therefore, what is desired is a processor architecture suitable for graphics processing applications but with reduced power and size requirements.

In conventional GPUs, calculation of depth data and color data as well as texture coordinates may be hard coded. That is, portions of the GPU pipeline architecture are fixed in function. Consequently, results from the GPU pipeline architecture are stored in specific buffers associated with the respective depth, color, or texture coordinate data and have specific data write functions at each stage. As a result, the GPU is limited in its application by software engineers.

In addition, conventional GPUs may write depth, color, or various texture coordinate data to system memory on a pixel-by-pixel and stage-by-stage basis. For low power, and small screen size handheld devices, this pixel-by-pixel transfer may present a bottleneck in data transfer, since pixel information is typically reduced in size to accommodate the handheld devices. As a result, the bandwidth of the GPU architecture is extremely limited and may retard read and writes to the system memory slowing the overall speed and increasing power consumption of the GPU pipeline architecture.

SUMMARY OF THE INVENTION

Accordingly, the present invention provides, in various embodiments, a system and method for pixel data row forwarding in a 3-D graphics pipeline. The present invention provides for a general purpose or universal programmable data write stage that is flexible and not limited in its functionality. In addition, the present invention provides a data write stage that includes generic cache memories to support the general purpose programmable data write stage. Further, the present invention provides for cache memories of arbitrary size to increase the effective bandwidth of the 3-D graphics pipeline at the data write stage. Moreover, the present invention provides for pixel data row forwarding through a sequence of row pixel packets to reduce the number of clock cycles needed for processing the pixel packet through a subsequent traversal through the 3-D graphics pipeline.

Embodiments of the present invention pertain to systems and methods for row forwarding in a 3-D graphics pipeline including generic cache memories. Specifically, in one embodiment a data write unit capable of row forwarding in a graphics pipeline includes a first memory and logic. The first memory stores a plurality of rows of pixel information associated with a pixel. The plurality of rows of pixel information may be a pixel packet and includes data related to surface characteristics of the pixel and includes a first row and a second row. A data write unit includes first logic for accessing a portion of the second row and for storing data accessed therein into a portion of the first row. For instance, the data is moved from one row to another. The data write unit also comprises logic for recirculating the plurality of rows of pixel information to an upstream pipeline module for further processing thereof, e.g., for a subsequent traversal through the 3-D graphics pipeline.

In one embodiment, the data write unit takes data from a back end row and moves it to a front end row of the pixel packet before the recirculation thereof.

In another embodiment, a method for row forwarding for use in a graphics pipeline is disclosed. The method includes receiving a pixel packet including a plurality of rows of pixel information associated with a pixel. The plurality of rows of pixel information include data related to surface characteristics of the pixel. The plurality of rows include, but are not limited to, a first row and a second row. The method also includes accessing a portion of the second row for data. The method then stores the data accessed in the portion of the second row (e.g., a back end row) into a portion of the first row (e.g., a front end row). The method then recirculates the plurality of rows of pixel information to an upstream pipeline module for further processing.

In still another embodiment, a data write unit that is capable of pixel data row forwarding for use in a graphics pipeline supporting a handheld device is described. The data write unit includes a first memory, a second memory, and logic. The first memory is for storing a first row of pixel information from a pixel packet associated with a pixel. The pixel packet includes data related to surface characteristics of the pixel. The second memory is for storing a second row of pixel information from the pixel packet. A first logic is for accessing a portion of the second row and for storing data accessed therein into a portion of the first row. A second logic is for recirculating the pixel packet including the first row and the second row to an upstream pipeline module for further processing thereof. A third logic is for executing an instruction on the first row that is recirculated using the data accessed from the portion of the second row.

In its various embodiments, the present invention can significantly reduce the bandwidth requirements of a graphics architecture on a handheld computing device. In addition, the present invention reduces the power consumption of the graphics architecture on a handheld computing device.

BRIEF DESCRIPTION OF THE DRAWINGS

The accompanying drawings, which are incorporated in and form a part of this specification, illustrate embodiments of the present invention and, together with the description, serve to explain the principles of the invention:

Prior art

FIG. 13C is a block diagram of the three rows of the exemplary pixel packet of FIG. 13A at the beginning of its second pass through the 3-D graphics pipeline, in accordance with one embodiment of the present invention.

DETAILED DESCRIPTION OF THE INVENTION

Figure 1:
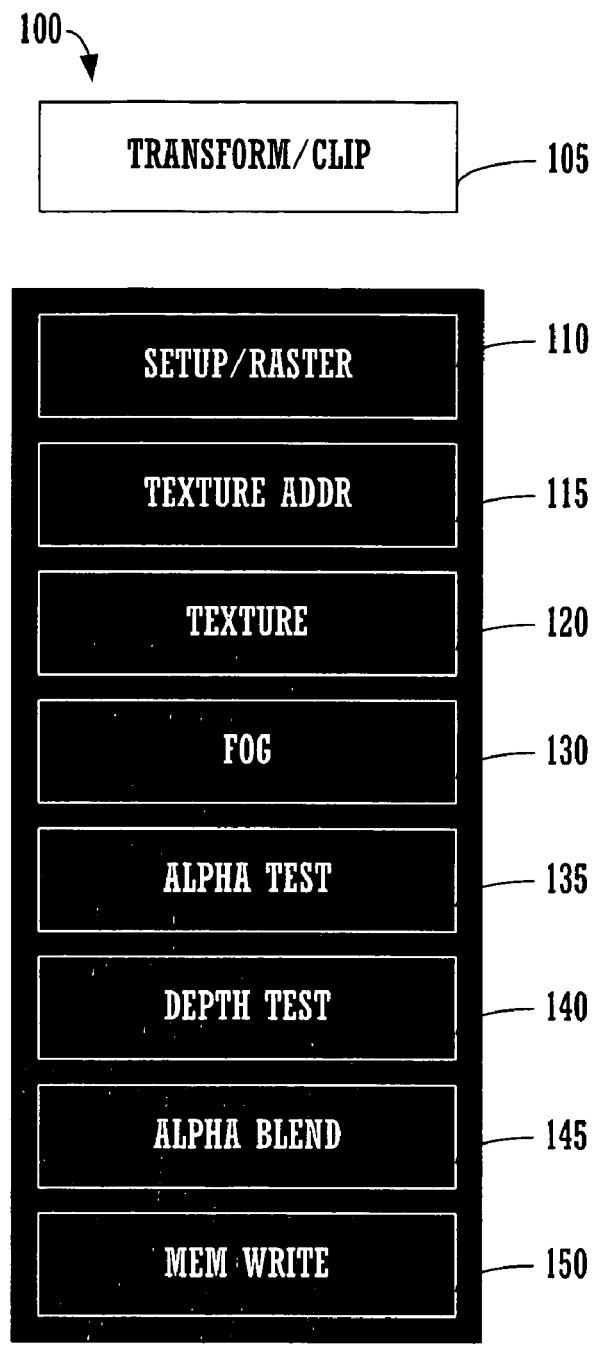
FIG. 1 shows a diagram depicting the various stages of a traditional prior art pipeline.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

In general, embodiments of the present invention reduce the processing requirements of a three-dimensional (3-D) graphics pipeline by providing for a general purpose programmable data write stage that is flexible and universal in its functionality. This is accomplished partly by providing a data write stage that includes generic cache memories to support the general purpose programmable data write stage of multiple pixel data types, e.g., different surface characteristics. In addition, the present invention provides for cache memories of arbitrary size to increase effective bandwidth of the 3-D graphics pipeline at the data write stage. Moreover, the present invention provides for pixel data row forwarding of data through a sequence of row information of a pixel packet to reduce the number of clock cycles needed for processing the pixel packet through the 3-D graphics pipeline on subsequent passes through the pipeline. These accomplishments result in increased processing speed, increased throughput, and reduced bandwidth. Embodiments of the present invention and their benefits are further described below.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "receiving" or "writing" or "storing" or "recirculating" or the like, refer to the actions and processes of a computer system (e.g., computer system 200 of FIG. 2), or similar electronic computing device, that manipulates and transforms data represented as physical (electronic) quantities within the computer system's registers and memories into other data similarly represented as physical quantities within the computer system memories or registers or other such information storage, transmission or display devices.

Figure 2:
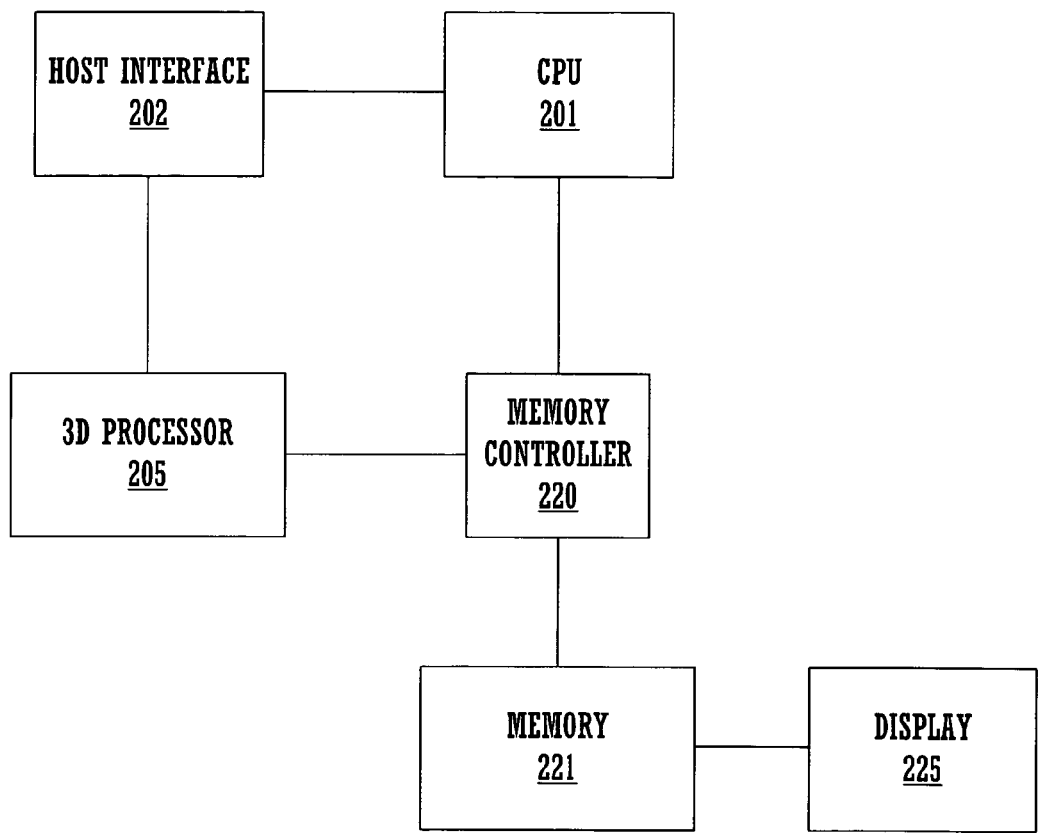
FIG. 2 shows a computer system in accordance with one embodiment of the present invention.

Computer System Platform:

With reference now to FIG. 2, a computer system 200 in accordance with one embodiment of the present invention is shown. Computer system 200 shows the components of a computer system in accordance with one embodiment of the present invention that provides the execution platform for implementing certain software-based functionality of the present invention. As depicted in FIG. 2, the computer system 200 includes a CPU 201 coupled to a graphics processor 205 via a host interface 202. The host interface 202 translates data and commands passing between the CPU 201 and the graphics processor 205 into their respective formats. Both the CPU 201 and the graphics processor 205 are coupled to a memory 221 via a memory controller 220. In the system 200 embodiment, the memory 221 is a shared memory, which refers to the property whereby the memory 221 stores instructions and data for both the CPU 201 and the graphics processor 205. Access to the shared memory 221 is through the memory controller 220. The shared memory 221 also stores data comprising a video frame buffer which drives a coupled display 225.

As described above, certain processes and steps of the present invention are realized, in one embodiment, as a series of instructions (e.g., software program) that reside within computer readable memory (e.g., memory 221) of a computer system (e.g., system 200) and are executed by the CPU 201 and graphics processor 205 of system 200. When executed, the instructions cause the computer system 200 to implement the functionality of the present invention as described below.

As shown in FIG. 2, system 200 shows the basic components of a computer system platform that implements the functionality of embodiments of the present invention. Accordingly, system 200 can be implemented as, for example, a number of different types of portable handheld electronic devices. Such devices can include, for example, portable phones, PDAs, handheld gaming devices, and the like. In such embodiments, components would be included that are designed to add peripheral buses, specialized communications components, support for specialized 10 devices, and the like.

Additionally, it should be appreciated that although the components 201-225 are depicted in FIG. 2 as discrete components, several of the components 201-225 can be implemented as a single monolithic integrated circuit device (e.g., a single integrated circuit die) configured to take advantage of the high levels of integration provided by modern semiconductor fabrication processes. For example, in one embodiment, the CPU 201, host interface 202, graphics processor 205, and memory controller 220 are fabricated as a single integrated circuit die.

Figure 3:
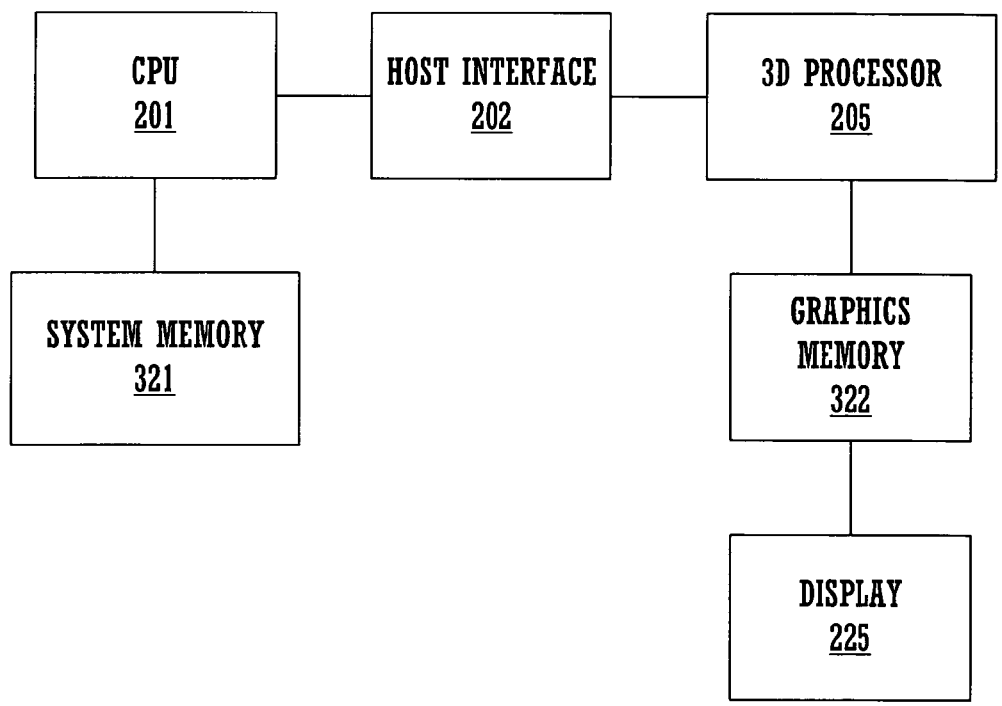
FIG. 3 shows a computer system in accordance with one alternative embodiment of the present invention.

FIG. 3 shows a computer system 300 in accordance with one alternative embodiment of the present invention. Computer system 300 is substantially similar to computer system 200 of FIG. 2. Computer system 300, however, utilizes the processor 201 having a dedicated system memory 321, and the graphics processor 205 having a dedicated graphics memory 322. In the system 300 embodiment, the system memory 321 stores instructions and data for processes/threads executing on the CPU 201 and the graphics memory 322 stores instructions and data for those processes/threads executing on the graphics processor 205. The graphics memory 322 stores data in a video frame buffer (not shown) which drives the display 225. As with computer system 200 of FIG. 2, one or more of the components 201-322 of computer system 300 can be integrated onto a single integrated circuit die.

Figure 4:
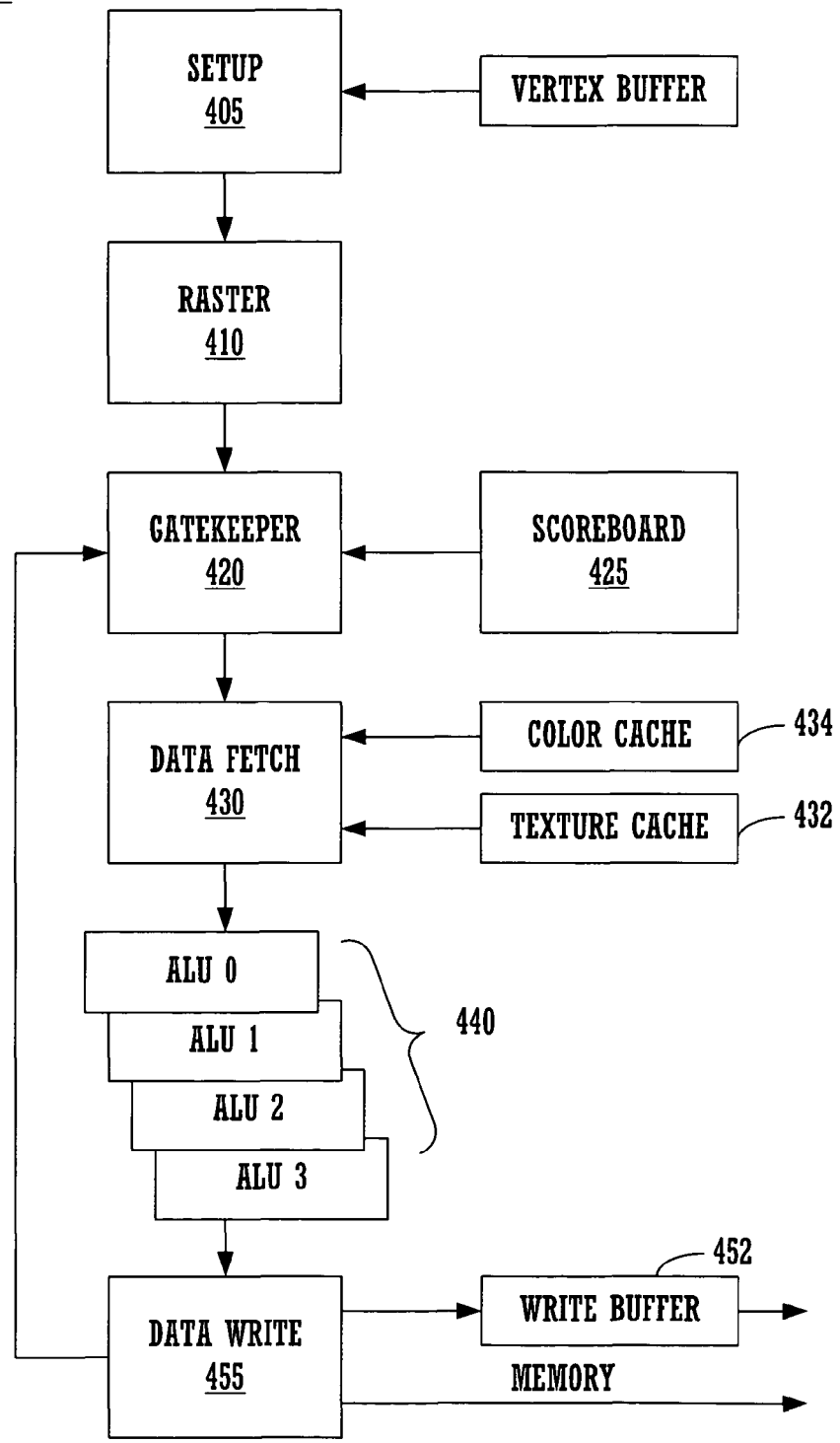
FIG. 4 is an exemplary block diagram illustrating the components comprising the programmable graphics processor in accordance with one embodiment of the present invention.

FIG. 4 is a block diagram illustrating the components comprising the programmable graphics processor 205 in accordance with one embodiment of the present invention. The programmable graphics process 205 illustrates a 3-D graphics pipeline, in one embodiment. As depicted in FIG. 4, the graphics processor 205 includes a setup stage 405, a raster stage 410, a gatekeeper stage 420, a data fetch stage 430, Arithmetic Logic Unit (ALU) pipeline 440, and a data write stage 455. In one embodiment, programmable graphics processor 205 includes ALUs 450 configured to execute a shader program to implement many different 3D graphics operations such as a texture combine, fog, alpha blend, alpha test, or other shading algorithms. However, it will be understood throughout the following discussion that programmable graphics processor 205 may also be configured to perform other types of processing operations.

A setup stage 405 receives instructions and graphics primitives from a host, such as a software application running on the CPU 201. In one embodiment, setup stage 405 performs the functions of geometrical transformation of coordinates (X-form), clipping, and setup on the primitives. The setup unit takes 3-D vertex information (e.g., x, y, z, color and/or texture attributes, etc.) and applies a user defined view transform to calculate screen space two-dimensional (2-D) coordinates for each geometric primitive (hereinafter described as triangles because primitives are typically implemented as triangles), which is then sent to the raster stage 410 to pixelize the given triangle. A vertex buffer 408 may be included to provide a buffer for vertex data used by setup stage 405. In one embodiment, setup stage 405 sets up barycentric coefficients. In one implementation, setup stage 405 is a floating point Very Large Instruction Word (VLIW) machine that supports 32-bit IEEE float, S15.16 fixed point and packed 0.8 formats.

Raster stage 410 receives vertex data from setup stage 405 regarding triangles that are to be rendered (e.g., converted into pixels). Raster stage 410 processes each pixel of a given triangle using interpolation and determines shader processing operations that need to be performed on a pixel as part of rendering, such as calculating color, texture, and fog operations. In one embodiment, raster stage 410 calculates barycentric coefficients for pixel packets. In a barycentric coordinate system, distances in a triangle are measured with respect to its vertices. The use of barycentric coefficients reduces the required dynamic range, which permits using fixed-point calculations that require less power than floating point calculations.

Raster stage 410 generates at least one pixel packet for each pixel of a triangle that is to be processed. Each pixel packet includes fields for a payload of pixel attributes required for processing (e.g., color, texture, depth, fog, (x,y) location) along with sideband information, and an instruction sequence of operations to be performed on the pixel packet. An instruction area in raster stage 410 (not shown) assigns instructions to pixel packets. The sideband information may also include a valid field, and a kill field. A pixel packet may include one or more rows of pixel data.

Gatekeeper stage 420 performs a data flow control function on pixels. In one embodiment, gatekeeper stage 420 has an associated scoreboard 425 for scheduling, load balancing, resource allocation, and hazard avoidance of pixel packets. Scoreboard 425 tracks the entry and retirement of pixels. Pixel packets entering gatekeeper stage 420 set the scoreboard and the scoreboard is reset as the pixel packets drain out of graphics processor 205 after completion of processing. Pixels recirculated through the pipeline are sent back to the gatekeeper from the data write unit 455.

Data fetch stage 430 fetches data for pixel packets passed on by gatekeeper 420. This may include, for example, fetching color, depth, and texture data by performing appropriate color, depth, or texture data reads for each row of pixel packets. The data fetch stage 430 may, for example, fetch pixel data from a frame buffer (not shown), and may also manage a local texture/fog cache 432 and a color/depth cache 434. Data that is fetched is placed onto a pixel packet field prior to sending the pixel packet on to the next stage.

The row of pixel packets enter an arithmetic logic unit (ALU) pipeline 440 for processing. ALU pipeline 440 has a sequence of ALUs. While four ALUs are illustrated, more or less ALUs may be used in ALU pipeline 440 depending upon the application.

The output of ALU pipeline 440 goes to universal data write stage 455. The data write stage 455 converts pixel packets into pixel data and stores the result in a write buffer 452 or directly to a frame buffer in memory. Examples of functions that data write stage 455 may perform include color and depth write back, and format conversion thereof.

Figure 5:
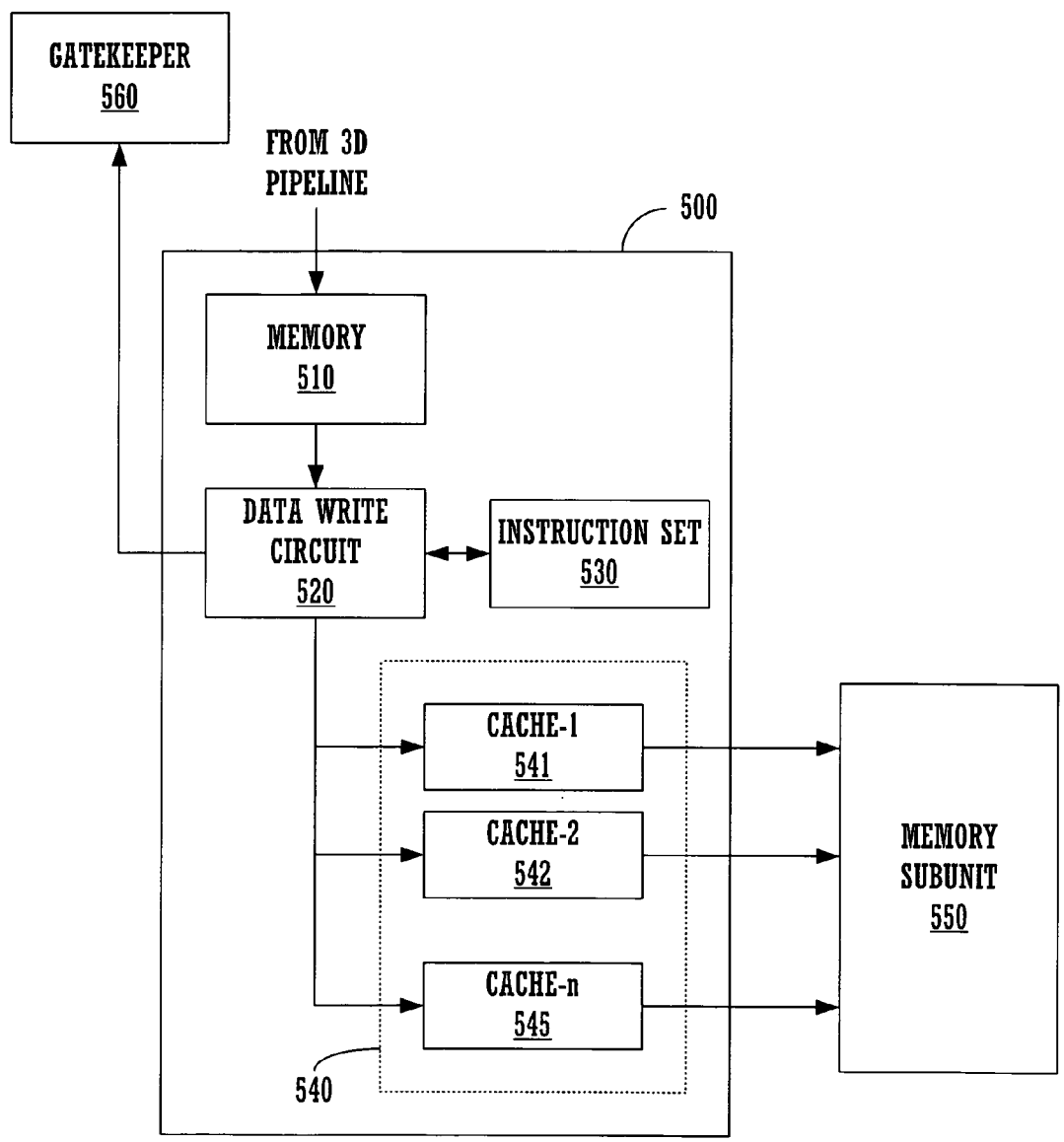
FIG. 5 is a block diagram of an exemplary data write unit with generic cache memories, in accordance with one embodiment of the present invention.

FIG. 5 is a block diagram of a general purpose or universal data write unit 500 that interfaces with a memory subunit 550, in accordance with one embodiment of the present invention. The data write unit 500 can be implemented within the 3-D graphics pipeline 205 of FIG. 4, in one embodiment, and as such, the data write unit 500 is representative of the data write unit 455 of FIG. 4. The data write unit 500 includes a memory 510, a data write circuit 520, an instruction set 530, and a plurality of cache memories 540.

The memory 510 is for receiving a pixel packet of information associated with a pixel. The pixel packet includes data related to surface characteristics of the pixel that are to be stored in memory 550. Such surface characteristics include, but are not limited to, color, depth, stencil, transparency, etc. The pixel packet includes at least one row of information, which is formatted into fields of the row including pixel parameters required for subsequent processing (e.g., color, texture, depth, fog, etc.). An example pixel packet is further described in relation to FIG. 6. In one embodiment, the memory 510 contains memory registers which store the data included within the pixel packet.

The data write unit 500 may include a plurality of cache memories 540 communicatively coupled to memory 510 for storing display pixel information. The pixel information is associated with a plurality of surface characteristics for a plurality of pixels. The plurality of cache memories 540 includes cache-1 541, cache-2 542, on up to cache-n 545. Each of the cache memories 540 are generic and are programmable according to data write instructions to be associated with a designated surface characteristic. For instance, the cache-1 541 may be associated with color, the cache-2 542 may be associated with depth. The number of surface attributes that are associated with the cache memories 540 are selectable. That is, one or more surface attributes may be displayed. The data write unit is flexible in that more surface attributes may be used (e.g., stencil) if required by the application.

The data write circuit 520 is coupled to the memory 510 and the plurality of cache memories 540. The data write circuit 520 is operable under program control to obtain designated portions of the pixel packet in the memory 510 for storage into the plurality of cache memories to be possibly displayed or used in subsequent rendering steps.

Cache memories 540 are useful in maintaining a high effective bandwidth of data transfer to the memory subunit 550. In other words, cache memories 540 collect data until some threshold amount is reached, e.g., 128 bits, and then issue a write to the memory subunit 550 thereby reducing the number of write transactions required by the data write unit 500.

In addition, the data write circuit 520 is communicatively coupled to the gatekeeper 560. In this way, pixel packets can be recirculated through the 3-D graphics pipeline for further processing if needed, and the gatekeeper 560 can regulate and order the flow of pixel packet traffic through the 3-D pixel graphics pipeline. For instance, the gatekeeper 560 can retire pixel packets when they have completed processing through the 3-D graphics pipeline.

The data write unit 500 includes an instruction set 530 which contains a list of operations. The selectable operations are performed on the pixel packet and provide the data write unit 500 programmable features through the choice and ordering of operations performed on the pixel packet of information. In the present embodiment, the operations are performed by the data write circuit 520.

In one embodiment, the data write unit 500 is responsive to an instruction format comprising a designation of a portion of a row of pixel information as a source and a designation of a cache memory as a destination. For example, in one embodiment, the instruction set 530 includes programmable instructions. One portion of the instruction includes directions to which part of the row of information to extract pixel data. That is, which field is extracted from the row of information for which component. Another portion of the instruction controls optional dithering, i.e., whether to add a dither value or not. Dithering is a well-known technique for improving image quality when reducing color precision (for example, when packing red, green and blue components into a 16-bit quantity). Another portion of the instruction controls how the extracted pixel data is formatted before storage into memory (e.g., reducing color precision from eight to five bits per pixel). Another portion of the instruction includes directions indicating which surface buffer is to receive the written data. Another portion of the instruction includes whether or not the data is written (i.e., whether to execute the instruction at the specified instruction sequence position). Still other portions of the instruction dictate which field of the row of information corresponds to which channel of output data (e.g., red, green, or blue).

In the present embodiment, the instruction set 530 includes 8 instructions applied to the pixel packet based on the instruction sequence number stored as sideband information in the pixel packet. Other embodiments are well suited to instruction set 530 with varying numbers of instructions, such as more than 8, or less than 8. Other embodiments may utilize other mechanisms for selecting the instruction to be executed (e.g., sequential execution based on row number).

A memory subunit 550 is communicatively coupled to the plurality of cache memories 540 for storing display pixel data. In one embodiment, each of the plurality of cache memories 540 is controlled by a memory controller to interface with the memory subunit 550. In one embodiment, the data write unit 500 contains two separate caches, which may be used to store separate surfaces, such as color or depth under software control (e.g., by the selection of the appropriate instructions 530).

Periodically, data is flushed from the cache memories 540 to the memory subunit 550. A double buffering mechanism can be used for each cache wherein a first cache receives data from the data write circuit 520 while another is being flushed to the memory subunit 550, and then their roles reverse, etc.

Figure 6:
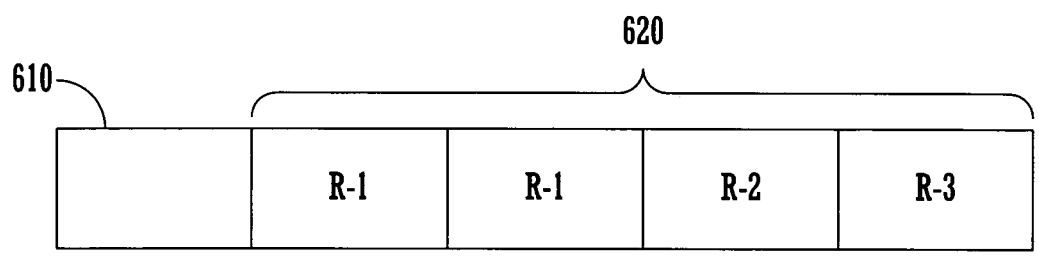
FIG. 6 is a block diagram of an exemplary row of information from a pixel packet illustrating a payload of four discrete units of information, in accordance with one embodiment of the present invention.

Turning now to FIG. 6, a block diagram of a row 600 of pixel information is shown, in accordance with one embodiment of the present invention. A pixel packet may contain one or more rows of pixel information that are processed in one or more passes through the 3-D graphics pipeline in sequential order. The pixel packet, in general, contains storage locators for a complete set of descriptions for a pixel in a graphical display. In the present embodiment, the row 600 of information includes sideband information 610 and payload information 620.

The sideband information 610 includes various fields of identifying or "accounting" information. For purposes of illustration only, the sideband information 610 may include an "even/odd" field, a "kill" field, and a "sequence" field. The "even/odd" field identifies a row of information to a particular pixel when interleaving rows of one or more pixel packets through the 3-D graphics pipeline. Interleaving rows of information from different pixel packets hides latency within the 3-D graphics pipeline. The "sequence" field links the row 600 of information to an instruction that is to be applied to the row 600. For instance, the instruction can be located in the set of instructions 530.

The payload 620 may be broken into 4 discrete units of data, R-0, R-1, R-2, and R-3, in one embodiment. The information included within the payload 620 includes, for example pixel attributes (color, depth, texture) that are processed to produce the displayed pixel information. In the present embodiment, pixel attributes in each row of a pixel packet as illustrated by row 600 may include four sets of 20 bit values (e.g., R-0, R-1, R-2, and R-3), for an 80 bit row of information. Examples of pixel attributes include 16-bit Z depth values, 16-bit (s,t) texture coordinates, 4-bit level of detail values, a pair of color values, or packed RGBA color values, etc. Other embodiments are well suited to varying numbers of discrete units of data, and payloads of varying lengths.

In another embodiment, the data write unit 500 may be used in a 3-D graphics pipeline that supports a handheld device, such as a cell phone, PDA, etc. The data write unit comprises a first memory for receiving at least one row of pixel information of a pixel packet of information. The pixel packet is associated with a pixel. The pixel packet includes data related to a plurality of surface characteristics of the pixel.

The data write unit 500 may include a first cache memory for storing pixel information associated with a first surface characteristic for a plurality of pixels, e.g., color. In addition, the data write unit may include a second cache memory for storing pixel information associated with a second surface characteristic for a plurality of pixels, e.g., depth. In other embodiments, more cache memories may be included to increase the quality or capability of the display data produced by the 3-D graphics pipeline.

The data write unit 500 also includes a data write circuit, as previously described. The data write unit is operable under program control to obtain a first designated portion, e.g., from 620, of a first row of pixel information for storage into the first cache memory, e.g., 541. The data write unit 500 is further operable under program control to obtain a second designated portion, e.g., of 620, of a second row of pixel information for storage into the second cache memory, e.g., 542. In one embodiment, the first designated portion and the second designated portion may be included in the same row or different rows of pixel information.

Figure 7:
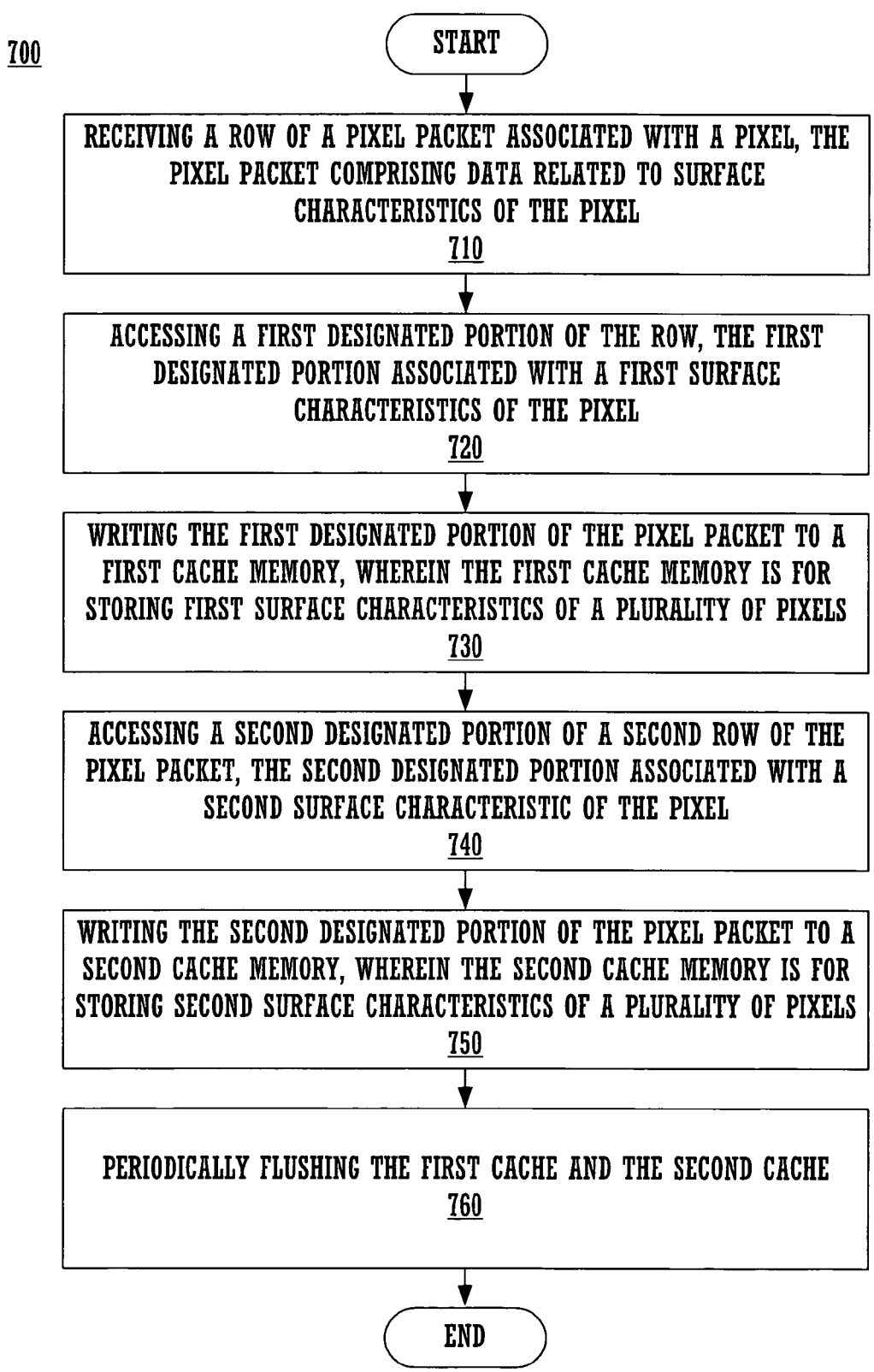
FIG. 7 is a flow chart illustrating steps in a computer implemented method for processing pixel packets of information through a programmable data write unit with generic cache memories, in accordance with one embodiment of the present invention.

With reference now to FIG. 7, a flowchart 700 of a method for writing data from a 3-D graphics pipeline is illustrated, in accordance with one embodiment of the present invention. In one embodiment, the graphics pipeline may be performed on a handheld device such as, for example, a personal digital assistant, a mobile phone, a handheld gaming device, or the like.

At 710, the data write unit receives a row of a pixel packet. The pixel packet is associated with a pixel, and provides pixel attributes processed by the 3-D graphics pipeline to output display pixel data, e.g., for a frame buffer and/or a depth buffer. Specifically, the pixel packet includes data related to surface characteristics of pixel. Typically, at some point in the 3-D graphics pipeline, the row of information includes the processed data related to surface characteristics of the pixel.

At 720, under program control in response to an instruction, the data write unit accesses a first designated portion of the row. That is, for example, the present embodiment accesses a register associated with the payload of the row of information to access the data related to surface characteristics. In the present embodiment, the first designated portion is associated with a first surface characteristic of the pixel, such as color or depth. Other embodiments may include other surface characteristics, such as stencil, etc.

At 730, the present embodiment writes the first designated portion of the pixel packet to a first cache memory. The first cache memory is not specific to any surface characteristic, until programmably designated. At that time, the first cache memory is for storing first surface characteristics of a plurality of pixels. In this way, the present embodiment implements a flexible and general purpose data write unit that can implement any number of surface characteristics.

At 740, the present embodiment further includes the operation of accessing a second designated portion of a second row of the pixel packet according to an instruction. In this case, the second designated portion is associated with a second surface characteristic of the pixel. As such, display pixel data for the pixel includes a first and second surface characteristic, such as color and depth. Other embodiments include the use of additional display attributes, such as stencil.

At 750, the present embodiment further includes writing the second designated portion of the pixel packet to a second cache memory. As with the first cache memory, the second cache memory is programmably selectable, and is for storing second surface characteristics of the plurality of pixels.

In one embodiment, the data describing the first surface characteristic and data describing the second surface characteristic is included within one row of the pixel packet. In other embodiments, the data describing the first surface characteristic is included within a first row, and data describing the second surface characteristic is included within a second row of the pixel packet of information.

At 760, the present embodiment periodically flushes the first cache to a memory subunit, as previously described. In addition, the present embodiment periodically flushes the second cache, as previously described. For instance, the first and second caches are flushed when reaching a threshold, such as 128 bits.

Figure 8A:
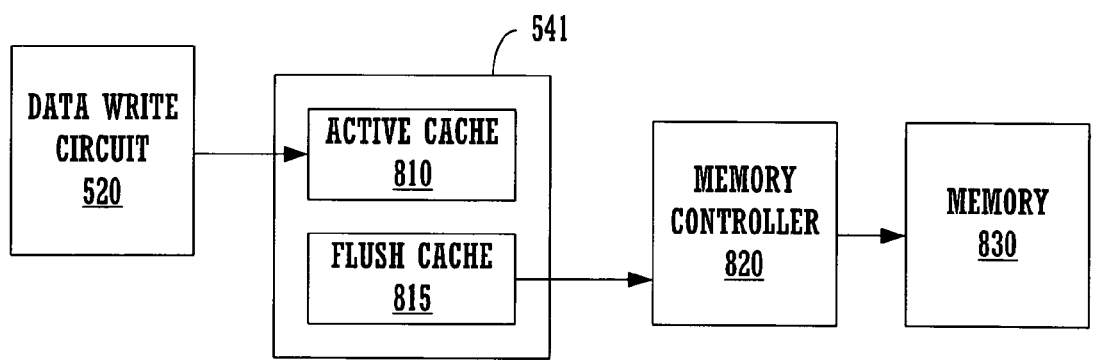
FIG. 8A is a block diagram of double buffer characteristics of a generic cache memory of a programmable data write unit, in accordance with one embodiment of the present invention.

FIG. 8A is a block diagram of double buffer characteristics of a generic cache memory of a programmable data write unit, in accordance with one embodiment of the present invention. For instance, the cache memory of FIG. 8A is representative of each of the cache memories in the plurality of cache memories 540 (e.g., cache memory 541) in the data write unit 500 of FIG. 5.

In the present embodiment, the cache memory 541 includes two buffers, an active cache 810 and a flush cache 815. The memory controller 820 performs dual functions by controlling reads and writes to the active cache 810 from within the data write unit, as well as reads and writes from the flush cache 815 to the memory subsystem 830 (e.g., SRAM, DRAM, etc.). As shown in FIG. 8A, the active cache 810 is actively receiving data of a pixel packet from a data write circuit, e.g., 520, and the flush cache 815 has flushed data to the memory subsystem 830, or is idle.

In other embodiments, the cache memory includes a plurality of buffers for increased performance. In this case, the memory controller 820 controls the reads and writes to the active and flush caches in the plurality of buffers.

At the appropriate time, the memory controller will switch the functions of the caches 810 and 815, so that cache 810 becomes the flush cache that is flushing data to the memory subsystem 830 and the cache 815 is receiving data from the data write circuit.

In one embodiment, the contents of cache memory 541 is periodically flushed to the memory subsystem. Specifically, on an ongoing basis the contents of the active cache 810 is flushed to the memory subsystems 830.

In one embodiment, the active cache 810 is designated as the flush cache and flushed when the cache is full of data. In another embodiment, the active cache 810 is designated as the flush cache and flushed when an address scan line is changed. That is, pixels of a triangle are processed across a horizontal scan line. When the end of a scan line is reached the last pixel of that triangle is processed, and the address of the scan line changes. The next pixel in the triangle is located on the next scan line. At that time, the active cache 810 is designated a flush cache and the data is flushed. In still another embodiment, the active cache 810 is flushed after siting idle for an arbitrary number of clock cycles. In the present embodiment, the active cache 810 may be flushed after 8 clock cycles, since 8 pixels of display data can be included in the active cache. In a further embodiment, the active cache 810 is flushed upon receipt of a command indicating to do so under software control (e.g., at the end of a frame of rendering).

In one embodiment, the data write unit is capable of indicating which pixels have been written to the memory subsystem, or are killed because they have the kill bit set. That is, the data write unit is able to communicate with the gatekeeper module in order to retire pixels through the 3-D graphics pipeline. In that case, once the flush cache 815 is written to the memory subsystem 830, all the register bits associated with those pixels written to the memory subsystem are cleared for later processing with other pixel data.

For instance, the data write unit is able to notify the gatekeeper unit, e.g., 420, and/or the scoreboard unit, e.g., 425, when a pixel packet is retired. Specifically, the data write unit notifies the gatekeeper and or scoreboard when the pixel packet is killed, so that the pixel packet can be retired. A pixel packet can be killed when any row associated with the pixel packet has a kill bit set, as will be further described below. In addition, the data write unit notifies the gatekeeper and/or scoreboard when the pixel packet has been written to a memory subunit outside of the data write unit, so that the pixel packet can be retired. For instance, a write enable designator in the pixel packet indicates that the pixel packet has been written to the memory subunit. In one embodiment, the data write unit also sets the write enable designator in the pixel packet when the pixel packet is killed, even though the pixel packet has been killed and is not written to a memory subunit, so that the gatekeeper and/or scoreboard can retire the pixel packet.

Figure 8B:
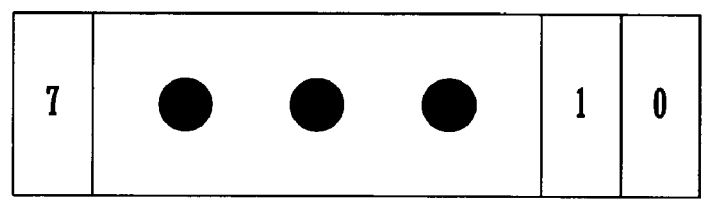
FIG. 8B is a block diagram of an output word of pixel information, in accordance with one embodiment of the present invention.

FIG. 8B is a block diagram of an output word 850 of pixel information for a plurality of pixels, in accordance with one embodiment of the present invention. The output word 850 is of a designated width for storing pixel information associated with an associated surface characteristic. In the present embodiment, the output word includes 8 pixels of information, each of which are 16 bits in width because the bus width is 128 bits wide. The 16 bytes of information correspond to display information for 8 pixels 0-7. As such, the output word is 128 bits in width. That is, 8 pixels of display data can be included in the 128 bit word 850.

As a result, the bandwidth of the 3-D graphics pipeline is increased. Instead of a pixel-by-pixel bandwidth of 16 bits, 128 bits of data can be read or written in one clock cycle. As such, in one clock, 16 bytes of information corresponding to 8 pixels can be written, instead of the traditional 2 bytes of information that corresponds to 1 pixel. This significantly increases efficiency of the utilized bandwidth of the 3-D graphics pipeline at the data write unit, since writing less data still consumes an entire 128-bit cycle on the memory bus.

Figure 9:
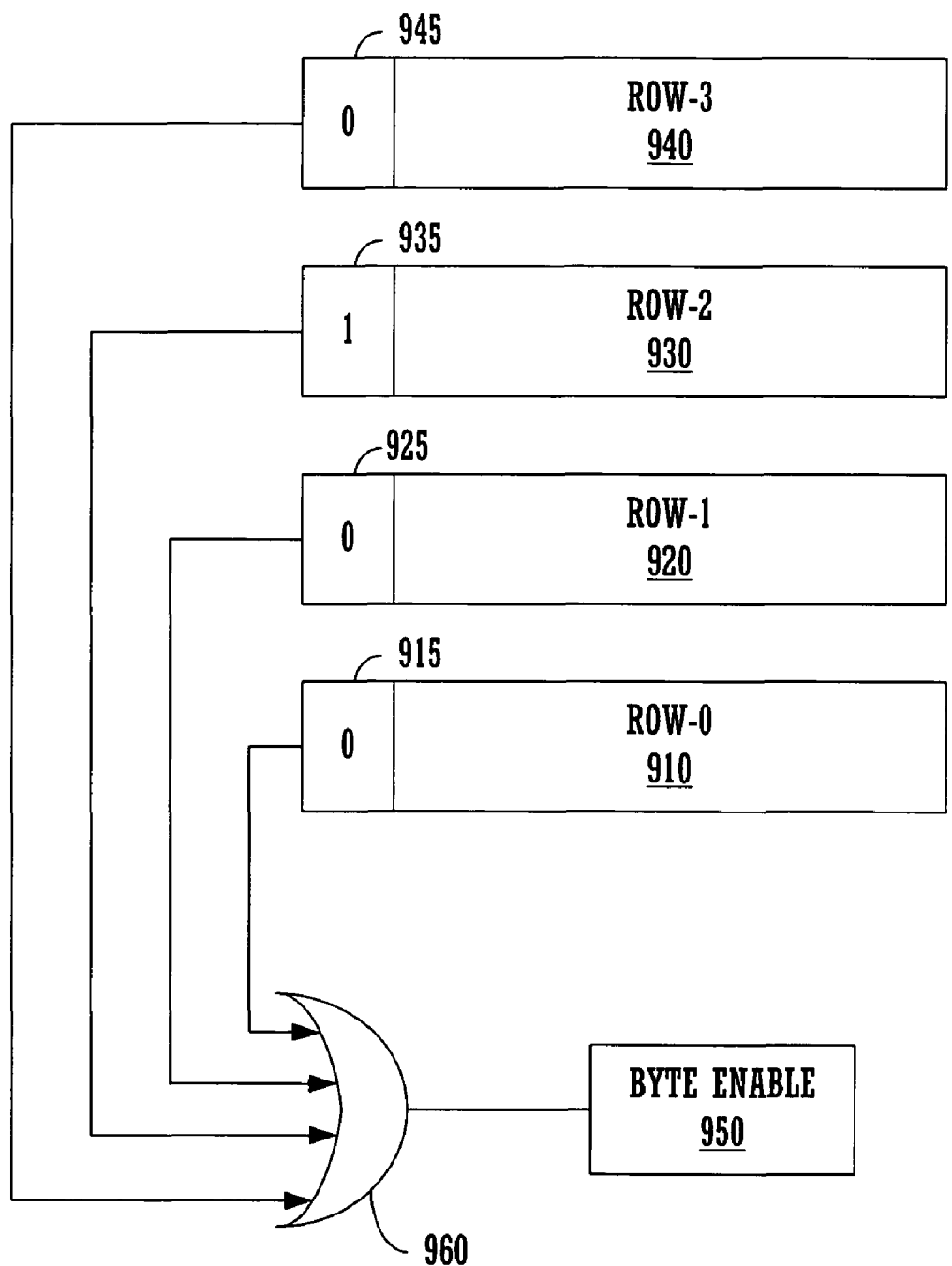
FIG. 9 is a block diagram illustrating the implementation of an "kill" designator in a pixel packet, in accordance with one embodiment of the present invention.

FIG. 9 is a block diagram of a pixel packet illustrating the propagation of a "kill" designator to the pixel packet, in accordance with one embodiment of the present invention.

The pixel packet in FIG. 9 includes 4 rows of information, row-0 910, row-1 920, row-2 930, and row-3 940, in sequential order. For purposes of illustration only, only the "kill" designator (a bit) in the sideband information for each of the rows is shown.

As discussed previously, when a "kill" designator is set, the payload portion of the pixel packet is no longer processed through the 3-D graphics pipeline, in one embodiment. That is, when a row of information includes a kill designation, the data write circuit in the data write unit is operable to write data from that row only when the "kill" designator is not set. Specifically, the designated portion of the row can be written only when a write enable bit is set in the row, and when a "kill" designator of that row is not set. Moreover, the data write circuit is operable to write data from the pixel packet only when all "kill" designators from each row of information are not set.

In FIG. 9, the "kill" designator 915 is associated with row-0 910 and is not set. The "kill" designator 925 is associated with row-1 920 and is not set. The "kill" designator 935 is associated with row-2 and is set. The "kill" designator designator 945 is associated with row-3 and is not set.

The data write unit (e.g., data write unit 500 of FIG. 5) in the present embodiment is able to propagate the kill bit to the rows of the entire pixel packet. That is, the data write unit performs an OR function 960 on all the "kill" designators from the rows of the pixel packet.

As shown in FIG. 9, row-2 930 has a "kill" designator 935 that is set. The "kill" designator 935 is propagated through the pixel packet using the OR function 960. As such, the data write unit through communication with the appropriate memory controller is capable of disengaging the byte enable 950. Since the byte enable 950 is disengaged, pixel data from the pixel packet shown in FIG. 9 cannot be written to the buffer cache memories, or in another case, from the buffer cache memories to the memory subsystem. As discussed previously, the "kill" designator may be communicated to the gatekeeper and/or the scoreboard units upstream in the 3-D graphics pipeline.

Figure 10:
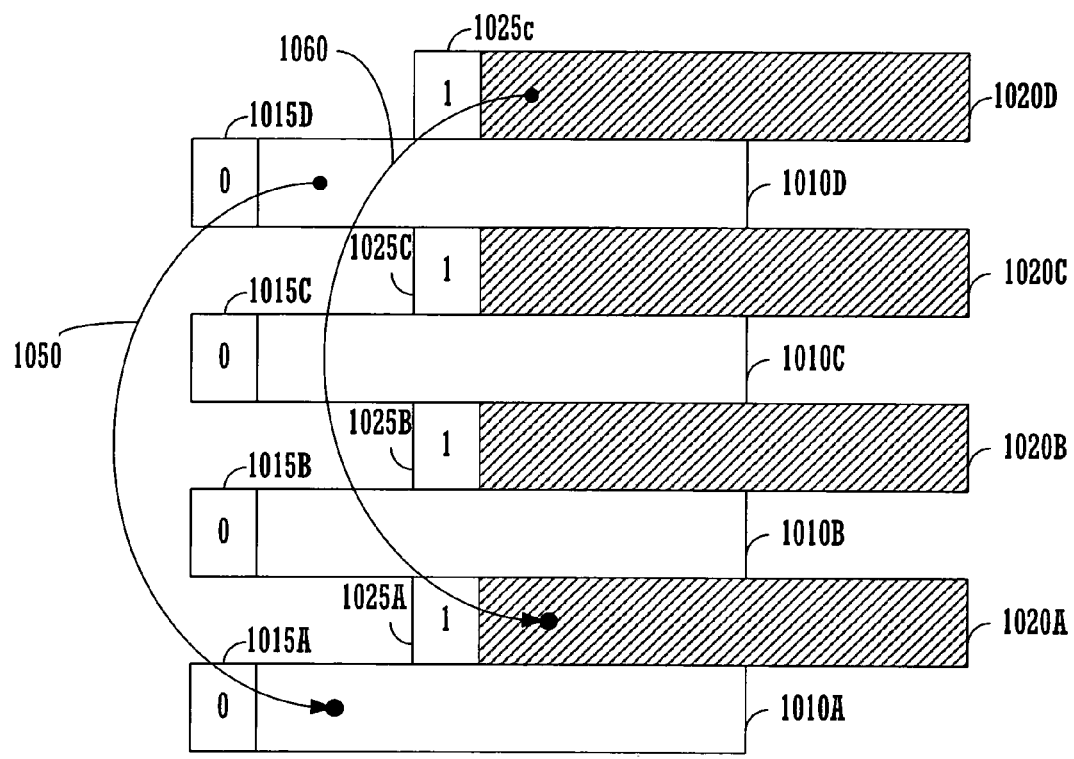
FIG. 10 is an exemplary block diagram of interleaved rows of pixel information for two pixel packets illustrating the row forwarding of data, in accordance with one embodiment of the present invention.

FIG. 10 is a block diagram of interleaved rows of pixel information for two pixel packets illustrating the row forwarding of pixel data, in accordance with one embodiment of the present invention. Two pixel packets are interleaved, by alternately presenting rows associated with the two pixel packets. Even rows of an even pixel (rows 1010A, 1010B, 1010C, and 1010D) are interleaved with odd rows of an odd pixel (rows 1020A, 1020B, 1020C, and 1020D).

Interleaving provides additional clock cycles to account for latency within the 3-D graphics pipeline. In addition, other embodiments are well suited to interleaving more than two pixel packets to address greater latency in the 3-D graphics pipeline.

For purposes of illustration only, only the "even/odd" bit is shown in the sideband of each of the even and odd rows of the even and odd pixel packets. For instance, the even pixel packet includes rows that have an even bit (zero bits 1015A, 1015B, 1015C, and 1015D). The odd pixel packet includes rows that have an odd bit (one bits 1025A, 1025B, 1025C, and 1025D).

As shown in FIG. 10, line 1050 and line 1060 indicate the forwarding of data from the last rows 1010D and 1020D of the even and odd pixel packets to rows that come earlier in a sequence of rows of the same pixel packet. For instance, line 1050 illustrates that data from row 1010D is forwarded to row 1010A that comes earlier in the sequence of rows for the even pixel packet. That is, the data from row 1010D is advanced a certain number of clock cycles.

Similarly, line 1060 illustrates that data from row 1020D is forwarded to row 1020A that comes earlier in the sequence of rows for the odd pixel packet. The row forwarding of data is accomplished by logic in the data write unit, as will be described below.

In one embodiment, the interleaved rows are paired to a clock cycle. In that case, the first row of each pixel packet, 1010A and 1020A, are paired and executed in one clock cycle. Also, the second row of each pixel packet, 1010B and 1020B, are paired and executed in one clock cycle. Similarly, for the third and fourth rows of each even and odd pixel packet.

Interleaving of rows is an optional feature of the 3-D graphics pipeline, in the present embodiment. As such, row forwarding is possible whether or not two or more pixel packets are interleaved as they are processed through the 3-D graphics pipeline.

In one embodiment, row forwarding of pixel data reduces latency in a 3-D graphics pipeline. The pixel packet may be distributed among rows of pixel information that is sequentially processed through the GPU pipeline architecture. The pixel packet may be recirculated through the GPU pipeline architecture in order to complete the 3-D processing; however, many times latency is introduced when rows that are recirculated have valuable data behind earlier rows which are no longer needed, and therefore must wait a number of clocks before data that was previously calculated during the first pass is encountered for further use. As a result, power consumption is increased as the more clocks are needed to fully process the pixel information through the GPU pipeline architecture. The present embodiment forwards pixel data between rows to reduce latency in the 3-D graphics pipeline.

Figure 11:
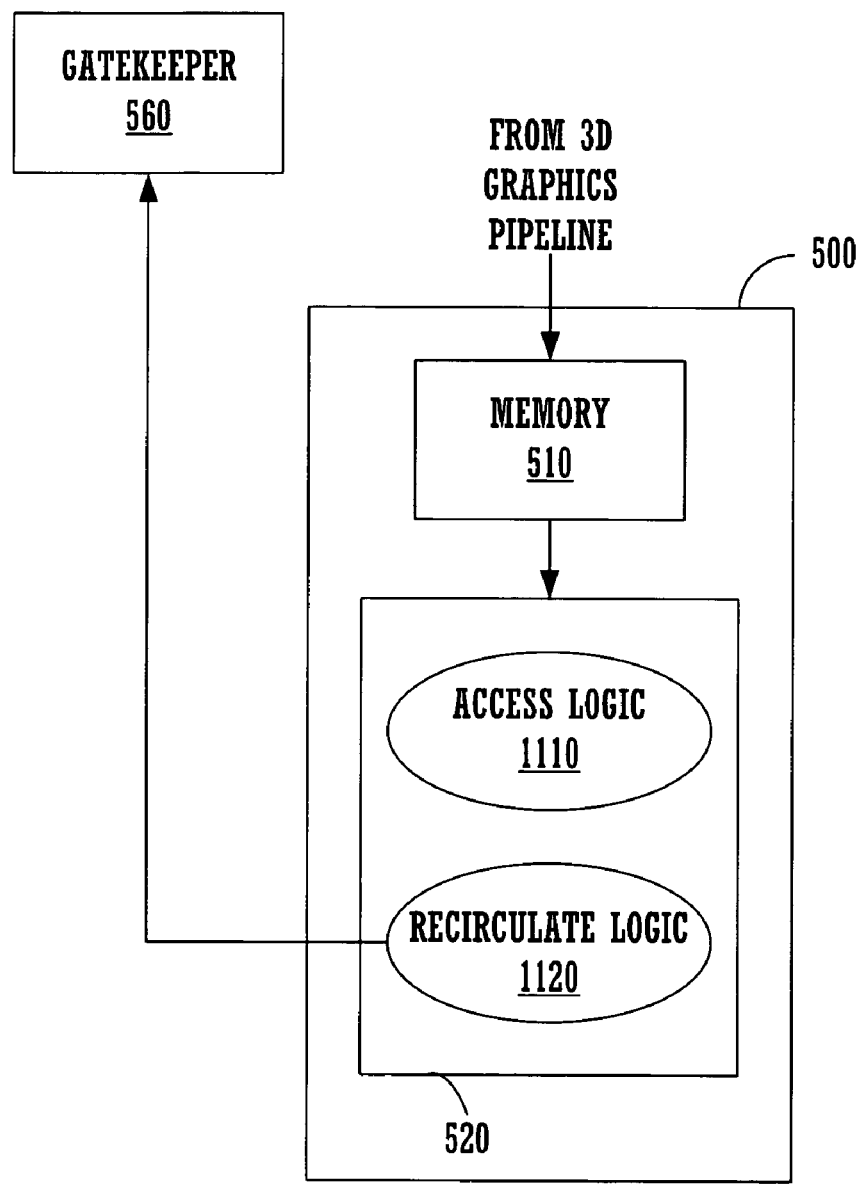
FIG. 11 is a block diagram of an exemplary data write unit capable of row forwarding of data, in accordance with one embodiment of the present invention.

FIG. 11 is a block diagram of the data write unit 500 for use in a graphics pipeline that is capable of row forwarding of pixel data, in accordance with one embodiment of the present invention. FIG. 11 is substantially similar to FIG. 5. For instance, memory 510 is for storing a plurality of rows of pixel information associated with a pixel. The plurality of rows of pixel information include data related to surface characteristics of the pixel. Further, in the present embodiment, the plurality of rows include, but are not limited to, a first row and a second row. In addition, the data write circuit 520 includes access logic 1110 and recirculate logic 1120.

The access logic 1110 provides for accessing a portion of the second row for data. The access logic 1110 also provides for storing the data accessed from the second row into a portion of said first row. In the present embodiment, the first row comes before the second row in a sequence of rows of a pixel packet of information.

In one embodiment, the second row is a final row in the sequence of a plurality of rows of pixel information. For example, referring to FIG. 10, the second row in the even pixel packet is the last row 1010D. Also, in the present embodiment, the first row is a beginning row in the sequence of the plurality of rows of pixel information. For example, again referring to FIG. 10, the first row in the even pixel packet is the beginning row 1010A. As such, as shown in FIG. 10, data from row 1010D is transferred, or stored in the row 1010A.

The recirculate logic 1120 recirculates the plurality of rows of pixel information to an upstream pipeline module in the 3-D graphics pipeline. Recirculation is necessary for complete processing of the pixel packet in some applications. In one embodiment, the upstream pipeline module is the gatekeeper module, which regulates flow of pixel information through said graphics pipeline. In another embodiment, the upstream pipeline module is the datafetch module.

Row forwarding reduces processing clock cycles. That is, when recirculating data through the 3-D pipeline architecture, current values of processing in a single pass of the pixel packet tend to fall back to the last or rear rows in the packet. As the pixel packet gets recirculated, the earlier rows have need for those current values of processing, which are in the rear of the packet; however, a latency occurs, since those current values are still located in the last or rear row of the packet. Several clock cycles are still necessary to transfer those current values to the correct row for processing. In this case, a latency exists as the 3-D graphics pipeline must wait for the current values to propagate to the point at which further processing can occur.

Because all the rows of a particular pixel packet are within the control of the data write unit 500, row forwarding is possible within the current implementation of the data write unit 500 within a 3-D graphics pipeline. In this way, the data write unit 500 in the present embodiment is able to forward data from one rear row of the pixel packet to another front row that comes earlier in the sequence of rows for that pixel packet.

In another embodiment, a data write unit for use in a graphics pipeline supporting a handheld device is capable of row forwarding. The data write unit of the present embodiment includes a first memory for storing a first row of pixel information from a pixel packet associated with a pixel. The pixel packet includes data related to surface characteristics of the pixel.

The data write unit includes a second memory for storing a second row of pixel information from the pixel packet of information. In one embodiment, the first and second row of pixel information are memory registers.

The data write unit also includes logic for accessing data located in a portion of the second row. The logic also stores the data accessed therein into a portion of the first row. As described previously, the second row comes after the first row in a sequence of rows associated with the pixel packet of information.

In addition, the data write unit also includes logic for recirculating the pixel packet to an upstream pipeline module. That is, the first row and second row are recirculated to the upstream module for further processing.

Also, the data write unit includes logic for executing an instruction on the first row that is recirculated using the data accessed from the portion of the second row. In this way, clock cycles are not used for updating the data to the first row.

Figure 12:
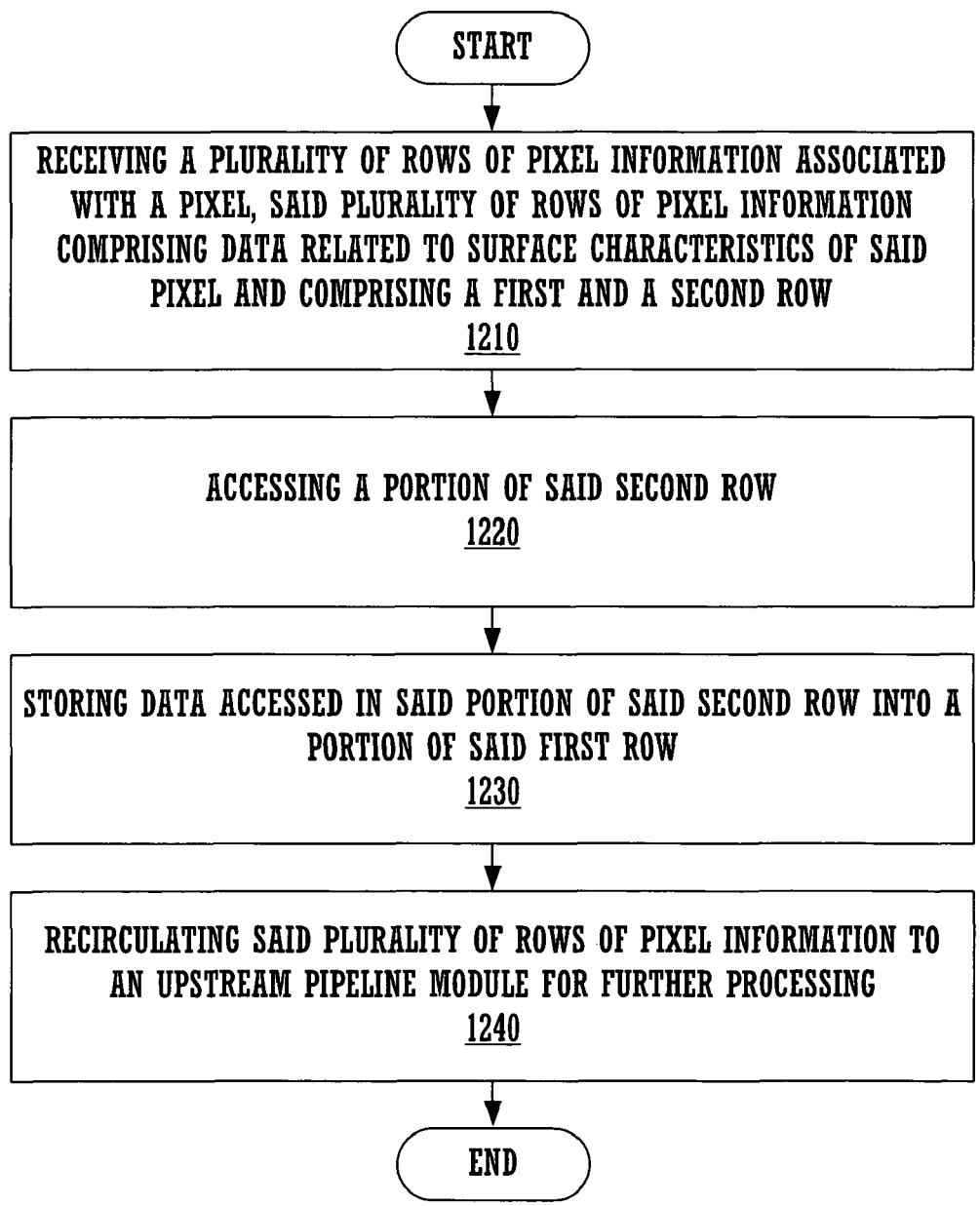
FIG. 12 is an exemplary flow chart illustrating steps in a computer implemented method for row forwarding of data through a sequence of rows of a pixel packet of information, in accordance with one embodiment of the present invention.

FIG. 12 is a flow chart illustrating a computer implemented process for a method of row forwarding for use in a 3-D graphics pipeline, in accordance with one embodiment of the present invention. The process is implemented within the data write unit of the 3-D graphics pipeline because the entire pixel packet is within the control of the data write unit, (e.g., in multiple stages of a pipeline).

At 1210, the present embodiment receives a plurality of rows of pixel information associated with a pixel. The plurality of rows of pixel information include data related to surface characteristics of the pixel. Further, the plurality of rows includes, but is not limited to, a first row and a second row.

At 1220, the present embodiment accesses a portion of the second row. As described previously, the second row comes later than the first row in a sequence of the plurality of rows.

For instance, the portion of the second row may contain a result from an execution of an instruction that was performed on the second row, in the current pass through the 3-D graphics pipeline. This result is then written to the portion of the second row that is later accessed. In this way, data that was generated clock cycles after the first row was processed may still be forwarded to that first row, in the present embodiment.

At 1230, the present embodiment stores data that is accessed from the second row in 1220 into a portion of the first row. In this way, as the plurality of rows of pixel information are recirculated through the 3-D graphics pipeline, there is no latency, as the first row already has the necessary data for processing. This is due to the forwarding of data accessed from the second row to the first row. A significant savings of clock cycles is achieved.

In one embodiment, the present embodiment overwrites data contained in the portion of the first row with data that is accessed from the second row.

At 1240, the present embodiment recirculates the plurality of rows of pixel information to an upstream pipeline module for further processing, as described previously. This is accomplished by sending the plurality of rows to the gatekeeper of the 3-D graphics pipeline. As described previously, the gatekeeper regulates flow of pixel information through the graphics pipeline.

Figure 13A:
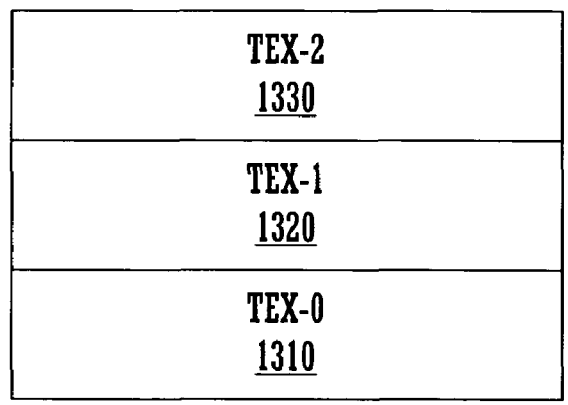
FIG. 13A is a block diagram of three rows of an exemplary pixel packet of information at the beginning of its first pass through the 3-D graphics pipeline, in accordance with one embodiment of the present invention.
Figure 13B:
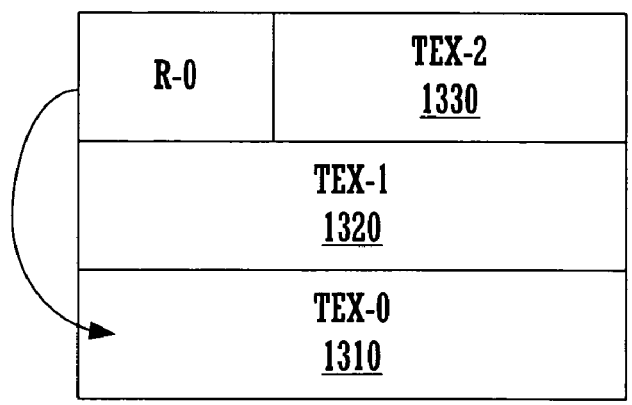
FIG. 13B is a block diagram of the three rows of the exemplary pixel packet of FIG. 13A illustrating the forwarding of data from the last row to the first row at the data write unit at the end of the first pass through the 3-D graphics pipeline, in accordance with one embodiment of the present invention.

FIGS. 13A, 13B and 13C provide an illustration of row forwarding of data to save clock cycles, in accordance with an embodiment of the present invention. In FIGS. 13A, 13B and 13C, different states of a pixel packet are presented as the pixel packet is processed through a 3-D graphics pipeline. The pixel packet includes three rows of information in the following sequence: row-0 1310, row-1 1320, and row-2 1330. That is, row-0 1310 is the beginning row of the sequence and row-2 1330 is the last row of the sequence.

Table 1 illustrates a sequence of operations to be performed on the pixel packet through parts of two passes through a 3-D graphics pipeline. In the first pass, operations are performed on row-0, row-1, and row-2 of the pixel packet. For purposes of illustration of row forwarding only, in the second pass, operations are only shown on row-0.

TABLE 1

| 1$^{st}$ Pass | row-0 | t-0 = Constant + tex-0 |
|---|---|---|
|  | row-1 | = t-0 * tex-1 |
|  | row-2 | R-0 = t-0 + tex-2 |
| 2$^{nd}$ Pass | row0 | R-0 * tex-3 |

FIG. 13A is a block diagram of a first state 1300A of the three rows 1310, 1320, and 1330. The first state represents the pixel packet at the beginning of its first pass through the 3-D graphics pipeline, in accordance with one embodiment of the present invention. That is, in state 1300A, data has been properly fetched into each of the rows 1310, 1320, and 1330 for the first pass through the 3-D graphics pipeline. As such, in the first pass, row-0 1310 contains tex-0, row-1 1320 contains tex-1, and row-2 1330 contains tex-2.

FIG. 13B is a block diagram of the three rows of the pixel packet of FIG. 13A illustrating the forwarding of data from the last row (row 1330) to the first row (row 1310) at the data write unit at the end of the first pass through the 3-D graphics pipeline, in accordance with one embodiment of the present invention. As shown in Table 1, in the first pass, row-2 1330 produces result R-0. The data write unit is capable of forwarding the result R-0 to row-0 1310 as shown by the arrow in FIG. 13B. The result R-0 overwrites portions of tex-0.

FIG. 13C is a block diagram of the three rows of the pixel packet of FIG. 13A at the beginning of its second pass through the 3-D graphics pipeline, in accordance with one embodiment of the present invention. As shown in FIG. 13C, row-0 1310 includes the result R-0, as well as tex-3 information that was fetched. As a result, the operation on row-0 in the second pass is possible since all the input data is available. Because of the row forwarding capabilities of the data write unit, a stall of the processing of the pixel packet is avoided, since the result R-0 is forwarded during the first pass through the 3-D graphics pipeline.

Accordingly, the present invention provides, in various embodiments, a system and method for pixel data row forwarding in a 3-D graphics pipeline. The present invention provides for a general purpose programmable data write stage that is flexible and not limited in its functionality. In addition, the present invention provides a data write stage that includes generic cache memories to support the general purpose programmable data write stage. Further, the present invention provides for cache memories of arbitrary size to increase bandwidth of the 3-D graphics pipeline at the data write stage. Moreover, the present invention provides for row forwarding of data through a sequence of row information of a pixel packet to reduce the number of clock cycles needed for processing the pixel packet through the 3-D graphics pipeline.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

What is claimed is:

1. A data write unit comprising:
   a first memory operable to store a pixel packet associated with a pixel, wherein said pixel packet comprises data related to surface characteristics of said pixel, wherein a first plurality of rows of said pixel packet is interleaved in said first memory with a second plurality of rows of at least one other pixel packet, and wherein said first plurality of rows comprises a first row and a second row;
   a first logic operable to modify said first row, using data accessed from said second row, to generate a modified first row; and
   a second logic operable to recirculate said modified first row and said second row to a component of a graphics pipeline for processing said modified first row before said second row.

2. The data write unit of claim 1 further comprising:
   third logic operable to execute an instruction on said modified first row using said data from said second row.

3. The data write unit of claim 1, wherein said component comprises a gatekeeper module operable to regulate flow of pixel information through said graphics pipeline.

4. The data write unit of claim 1, wherein said component comprises a data fetch module.

5. The data write unit of claim 1, wherein said second row is a final row in a sequence of said first plurality of rows of pixel information.

6. The data write unit of claim 5, wherein said first row is a beginning row in said sequence of said first plurality of rows of pixel information.

7. The data write unit of claim 1 further comprising:
   a plurality of cache memories coupled to said first memory and operable to store pixel information of a plurality of pixels, wherein at least one cache memory of said plurality of cache memories is associated with a first surface characteristic; and
   a data write circuit coupled to said first memory and said plurality of cache memories, wherein said data write circuit is operable under program control to obtain a portion of said pixel packet for storage into said plurality of cache memories.

8. The data write unit of claim 7, wherein said first surface characteristic is selected from a group consisting of color and depth.

9. The data write unit of claim 7, wherein said data write circuit is responsive to an instruction format comprising a designation of a portion of a row of pixel information as a source and a designation of a cache memory as a destination.

10. The data write unit of claim 7, wherein said first plurality of rows comprises a kill designation, and wherein said data write circuit is operable to write data from said first plurality of rows only when said kill designation is not set.

11. The data write unit of claim 7, wherein contents of each of said plurality of cache memories are periodically flushed to a memory subunit.

12. The data write unit of claim 7, wherein said plurality of cache memories comprises at least one double buffer, wherein said at least one double buffer comprises an active cache operable to receive information from said data write circuit, and wherein said at least one double buffer further comprises a flush cache operable to flush information to a memory subunit.

13. The data write unit of claim 7, wherein said plurality of cache memories comprises a plurality of buffers operable to receive information from said data write circuit, wherein said plurality of buffers are further operable to flush information to a memory subunit.

14. A method of processing a pixel packet, said method comprising:
   storing in a first memory said pixel packet associated with a pixel, wherein said pixel packet comprises data related to surface characteristics of said pixel, wherein a first plurality of rows of said pixel packet is interleaved in said first memory with a second plurality of rows of at least one other pixel packet, and wherein said first plurality of rows comprises a first row and a second row;
   modifying said first row, using data accessed from said second row, to generate a modified first row; and
   recirculating said modified first row and said second row to a component of a graphics pipeline for processing said modified first row before said second row.

15. The method of claim 14 further comprising:
   executing an instruction on said modified first row using said data from said second row.

16. The method of claim 14, wherein said component comprises a gatekeeper module operable to regulate flow of pixel information through said graphics pipeline.

17. The method of claim 14, wherein said component comprises a data fetch module.

18. The method of claim 14, wherein said second row is a final row in a sequence of said first plurality of rows of pixel information.

19. The method of claim 18, wherein said first row is a beginning row in said sequence of said first plurality of rows of pixel information.

20. The method of claim 14 further comprising:
   accessing, using a data write circuit, a portion of said pixel packet from said first memory; and
   storing, using said data write circuit, said portion of said pixel packet in a plurality of cache memories, wherein said plurality of cache memories are operable to store pixel information of a plurality of pixels, and wherein at least one cache memory of said plurality of cache memories is associated with a first surface characteristic.

21. The method of claim 20, wherein said first surface characteristic is selected from a group consisting of color and depth.

22. The method of claim 20, wherein said accessing and said storing are performed in response to an instruction with an instruction format comprising a designation of a portion of a row of pixel information as a source and a designation of a cache memory as a destination.

23. The method of claim 20, wherein said first plurality of rows comprises a kill designation, and further comprising:
   writing, using said data write circuit, data from said first plurality of rows only when said kill designation is not set.

24. The method of claim 20 further comprising:
   periodically flushing contents of each of said plurality of cache memories to a memory subunit.

25. The method of claim 20, wherein said plurality of cache memories comprises at least one double buffer, and further comprising:
   receiving, using an active cache of said at least one double buffer, information from said data write circuit; and
   flushing, using a flush cache of said at least one double buffer, information to a memory subunit.

26. The method of claim 20, wherein said plurality of cache memories comprises a plurality of buffers, and further comprising:
   receiving, using said plurality of buffers, information from said data write circuit; and
   flushing, using said plurality of buffers, information to a memory subunit.

* * * * *